(12) United States Patent
Blitzer et al.

(10) Patent No.: US 8,151,069 B1
(45) Date of Patent: Apr. 3, 2012

(54) MULTIPROTECTION FOR SNAPSNOTS

(75) Inventors: Aharon Blitzer, Shoham (IL); Aviram Katz, Kiryat Onno (IL); Roy Dahan, Ashdod (IL); Amit Lieberman, Raanana (IL); Maayan Maltz, Ein Hashofet (IL)

(73) Assignee: EMC Corporation, Hopkinton, MA (US)

( * ) Notice: Subject to any disclaimer, the term of this patent is extended or adjusted under 35 U.S.C. 154(b) by 675 days.

(21) Appl. No.: 12/290,306

(22) Filed: Oct. 29, 2008

(51) Int. Cl.
G06F 13/00 (2006.01)
G06F 13/28 (2006.01)

(52) U.S. Cl. ........ 711/162; 711/161; 711/154; 711/112; 711/E12.103

(58) Field of Classification Search .......................... None
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,819,292 A | 10/1998 | Hitz et al. | |
| 5,845,147 A | 12/1998 | Vishlitzky et al. | |
| 5,857,208 A | 1/1999 | Ofek | |
| 7,340,489 B2 | 3/2008 | Vishlitzky et al. | |
| 7,747,660 B1 * | 6/2010 | Rajan et al. | 707/821 |
| 2006/0069887 A1 | 3/2006 | LeCrone et al. | |

* cited by examiner

Primary Examiner — Reginald Bragdon
Assistant Examiner — Eric S Cardwell
(74) Attorney, Agent, or Firm — Muirhead and Saturnelli, LLC

(57) ABSTRACT

Providing a multiple protection snapshot copy of a logical device includes creating the snapshot copy of the logical device, where, in response to a write to a section of the logical device, data is copied to a first alternative storage area prior to the write and, following creating the snapshot copy, pointing portions of the snapshot copy to a second alternative storage area having data that is a copy of the logical device, where data corresponding to the snapshot copy is stored in one of: the first alternative storage area and the second alternative storage area. Providing a multiple protection snapshot copy of a logical device may also include, prior to pointing portions of the snapshot copy to the second alternative storage area and after creating the snapshot copy, copying data from the logical device to the second alternative storage area.

18 Claims, 9 Drawing Sheets

MULTIPROTECTION FOR SNAPSNOTS

BACKGROUND OF THE INVENTION

1. Technical Field

This application relates to computer storage devices, and more particularly to the field of maintaining copies of data for computer storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass., and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In some instances, it is desirable to provide a snapshot copy of a logical volume. The snapshot copy is a logical point-in-time version of the volume that may be obtained relatively quickly and without significant overhead by creating a data structure initially containing pointers that point to sections of the logical volume. As data is written to sections of the logical volume (e.g., tracks) two different versions of data are maintained. A first version of the data represents the original data that existed when the snapshot was initiated and a second version of the data represents the new data being written. Any subsequent writes to the same section overwrite the second version. There are many different specific mechanisms for providing snapshot copies. See, for example, U.S. Pat. No. 7,340,489 to Vishlitzky, et al. and U.S. Pat. No. 5,819,292 to Hitz, et al., both of which are incorporated by reference herein.

Snapshots are useful for recovering from logical errors. For example, if a logical device contains data for a database for which a snapshot copy is made at 10:00 a.m., and a user inadvertently erases important data at 11:00 a.m. (or a program error causes corruption of the data for the database), then it is possible to recover the 10:00 a.m. version of the data using the snapshot. Note also that, since a snapshot may be initiated by creating a table of pointers to actual data, then there is relatively little overhead/time associated with creating a snapshot.

Snapshots may not be as useful in the case of physical corruption of the data (e.g., failure of underlying physical hardware). For example, if a snapshot is taken of a logical volume V. containing track A, and if track A is then physically corrupted after initiation of the snapshot, then the snapshot, which points to corrupted track A, is not useful for recovering the data of track A. On the other hand, protection from physical corruption of the data may be obtained by performing a full copy of a logical volume, where the data of a volume is copied from a first logical volume to a second logical volume and where the first and second logical volumes correspond to separate physical storage space. In such a case, corruption of one physical storage space may not affect another physical storage space. However, there may be a significant amount of overhead/time associate with providing a full copy. Furthermore, additional complexities are introduced if it is desirable to have a full copy be a point-in-time copy.

Accordingly, it is desirable to provide a system that exhibits the low overhead and near instantaneous initiation advantages of a point-in-time snapshot copy while still protecting against physical corruption of the data.

SUMMARY OF THE INVENTION

According to the system described herein, providing a multiple protection snapshot copy of a logical device includes creating the snapshot copy of the logical device, where, in response to a write to a section of the logical device, data is copied to a first alternative storage area prior to the write and, following creating the snapshot copy, pointing portions of the snapshot copy to a second alternative storage area having data that is a copy of the logical device, where data corresponding to the snapshot copy is stored in one of: the first alternative storage area and the second alternative storage area. Providing a multiple protection snapshot copy of a logical device may also include, prior to pointing portions of the snapshot copy to the second alternative storage area and after creating the snapshot copy, copying data from the logical device to the second alternative storage area. Providing a multiple protection snapshot copy of a logical device may also include, prior to copying data from the logical device, allowing access to the logical device. Providing a multiple protection snapshot copy of a logical device may also include copying data from the first alternative storage area to the second alternative storage area. Providing a multiple protection snapshot copy of a logical device may also include, following copying data from the first alternative storage area to the second alternative storage area, releasing storage of the second alternative storage area. The first alternative storage area may be a pool device that includes a plurality of logical storage devices. The second alternative storage area may be another logical device.

According further to the system described herein, computer software, in a computer-readable storage medium, provides a multiple protection snapshot copy of a logical device. The software includes executable code that creates the snapshot copy of the logical device, where, in response to a write to a section of the logical device, data is copied to a first alternative storage area prior to the write and includes executable code that points portions of the snapshot copy to a second alternative storage area having data that is a copy of the logical device following creation of the snapshot copy, where data corresponding to the snapshot copy is stored in one of: the first alternative storage area and the second alternative storage area. The computer software may also include executable code that copies data from the logical device to the second alternative storage area prior to pointing portions of the snapshot copy to the second alternative storage area and after creating the snapshot copy. The computer software may also include executable code that allows access to the logical device prior to copying data from the logical device. The computer software may also include executable code that copies data from the first alternative storage area to the second alternative storage area. The computer software may also include executable code that releases storage of the second alternative storage area following copying data from the first alternative storage area to the second alternative storage area. The first alternative storage area may be a pool device that includes a plurality of logical storage devices. The second alternative storage area may be another logical device.

According further to the system described herein, a data storage device includes non-volatile memory and a plurality of directors, coupled to the nonvolatile memory, where at least one of the directors provides external access to the storage device and where at least one other one of the directors provides a multiple protection snapshot copy of a logical device of the data storage device by creating the snapshot copy of the logical device that, in response to a write to a section of the logical device, copies data to a first alternative storage area prior to the write and where the at least one other one of the directors points portions of the snapshot copy to a second alternative storage area having data that is a copy of the logical device following creation of the snapshot copy. Data corresponding to the snapshot copy may be stored in the first alternative storage area and/or the second alternative storage area. The at least one other one of the directors may copy data from the first alternative storage area to the second alternative storage area. The directors may access a global memory provided on the at least one of the directors. The first alternative storage area may be a pool device that includes a plurality of logical storage devices. The second alternative storage area may be another logical device.

BRIEF DESCRIPTION OF DRAWINGS

Embodiments of the system are described with reference to the several figures of the drawings, noted as follows.

DETAILED DESCRIPTION OF VARIOUS EMBODIMENTS

Figure 1:
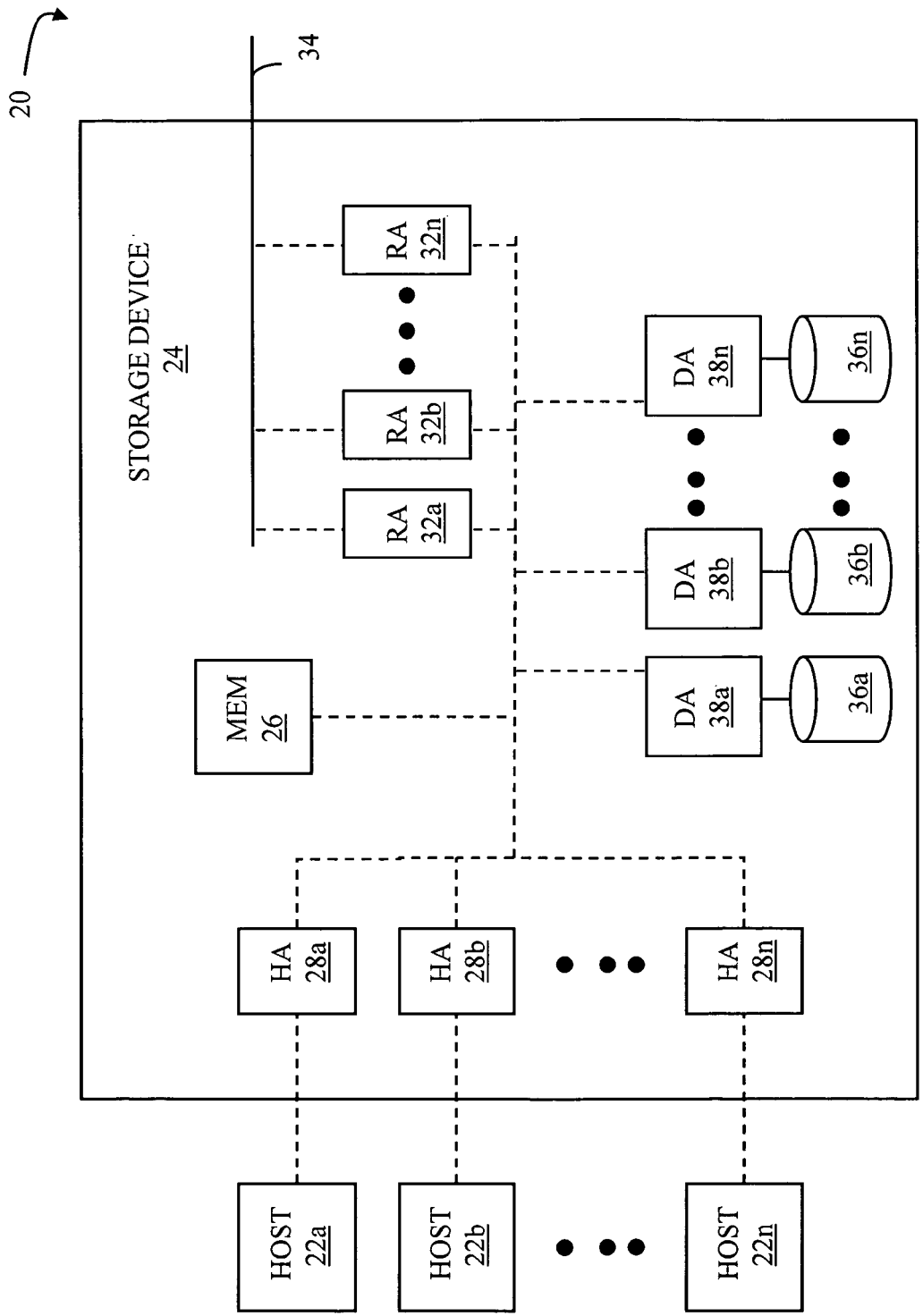
FIG. 1 is a schematic diagram showing a plurality of hosts and a data storage device that may be used in connection with the system described herein.

Referring now to the figures of the drawing, the figures comprise a part of this specification and illustrate exemplary embodiments of the described system. It is to be understood that in some instances various aspects of the system may be shown schematically or may be exaggerated or altered to facilitate an understanding of the system.

Referring to FIG. 1, a diagram 20 shows a plurality of hosts 22a-22n coupled to a data storage device 24. The data storage device 24 includes an internal memory 26 that facilitates operation of the storage device 24 as described elsewhere herein. The data storage device also includes a plurality of host adapters (HAs) 28a-28n that handle reading and writing data between the hosts 22a-22n and the storage device 24. Although the diagram 20 shows each of the hosts 22a-22n coupled to each of the HAs 28a-28n, it will be appreciated by one of ordinary skill in the art that one or more of the HAs 28a-28n may be coupled to other hosts and that one of the hosts 22a-22n may be coupled to more than one of the HAs 28a-28n.

The storage device 24 may include one or more Remote Data Facility (RDF) adapter units (RAs) 32a-32n. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RAs 32a-32n are coupled to an RDF link 34 and the RAs 32a-32n are similar to the HAs 28a-28n, but are used to transfer data between the storage device 24 and other storage devices (not shown) that are also coupled to the RDF link 34. The storage device 24 may be coupled to additional RDF links (not shown in FIG. 1) in addition to the RDF link 34. For further discussion of RDF and the use thereof in data recovery and storage techniques, see U.S. Pat. No. 5,742,792, which is incorporated by reference herein, and U.S. Patent App. Pub. No. 2006-0069887 to LeCrone, et al., entitled "Triangular Asynchronous Replication," which is incorporated herein by reference.

The storage device 24 may also include one or more disk drives 36a-36n (disk assemblies), each containing a different portion of data stored on the storage device 24. The disk drives 36a-36n should be understood as representing any appropriate type of storage media, including, without limitation, DRAM cache, flash or other solid-state storage device, tape, optical media, and/or any combination of permanent, semi-permanent and temporally-limited storage media. Each of the disk drives 36a-36n may be coupled to a corresponding one of a plurality of disk adapter units (DA) 38a-38n that provides data to a corresponding one of the disk drives 36a-36n and receives data from a corresponding one of the disk drives 36a-36n. Note that, in some embodiments, it is possible for more than one disk drive to be serviced by a DA and that it is possible for more than one DA to service a particular disk drive.

The storage space in the storage device 24 that corresponds to the disk drives 36a-36n may be subdivided into a plurality of volumes or logical storage devices. The logical storage devices may or may not correspond to the physical storage space of the disk drives 36a-36n. Thus, for example, the disk drive 36a may contain a plurality of logical storage devices or, alternatively, a single logical storage device could span both of the disk drives 36a, 36b. The hosts 22a-22n may be configured to access any combination of logical storage devices independent of the location of the logical storage devices on the disk drives 36a-36n. A device, such as a logical storage device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk drive. Other embodiments may use different structures.

One or more internal logical data path(s) exist between the DAs 38a-38n, the HAs 28a-28n, the RAs 32a-32n, and the memory 26. In some embodiments, one or more internal busses and/or communication modules may be used. In some embodiments, the memory 26 may be used to facilitate data transferred between the DAs 38a-38n, the HAs 28a-28n and the RAs 32a-32n. The memory 26 may contain tasks that are to be performed by one or more of the DAs 38a-38n, the HAs 28a-28n and the RAs 32a-32n, and a cache for data fetched from one or more of the disk drives 36a-36n. Use of the memory 26 is described in more detail hereinafter.

The storage device 24 may be provided as a stand-alone device coupled to the hosts 22a-22n as shown in FIG. 1 or, alternatively, the storage device 24 may be part of a storage area network (SAN) that includes a plurality of other storage devices as well as routers, network connections, etc. The storage device 24 may be coupled to a SAN fabric and/or be part of a SAN fabric. The storage device 24 may be a NAS. The system described herein may be implemented using software, hardware, and/or a combination of software and hardware where software may be stored in an appropriate storage medium and executed by one or more processors.

Figure 2:
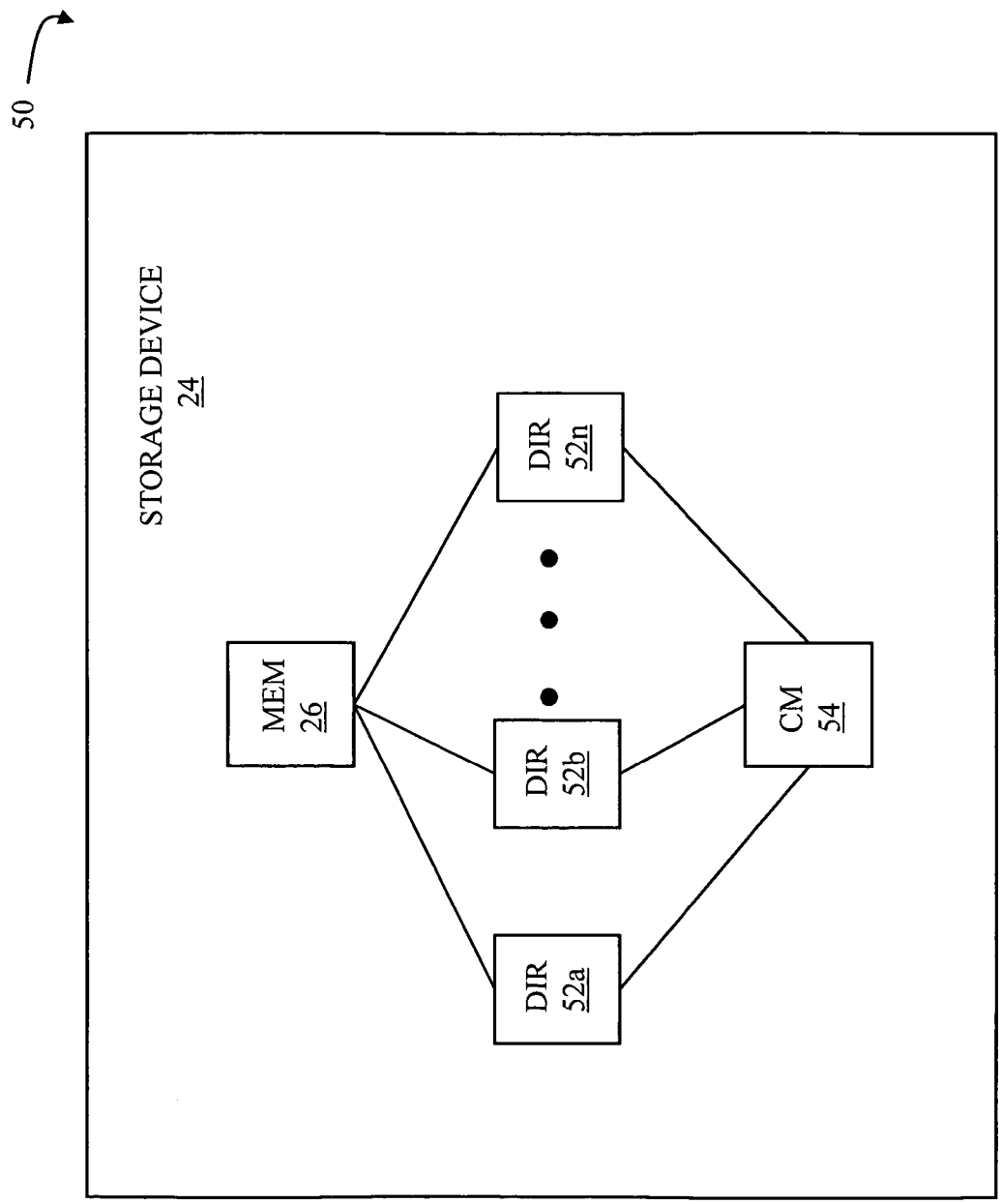
FIG. 2 is a schematic diagram showing a storage device, memory, a plurality of directors, and a communication module that may be used in connection with the system described herein.

Referring to FIG. 2, a diagram 50 illustrates an embodiment of the storage device 24 where each of a plurality of directors 52a-52n are coupled to the memory 26. Each of the directors 52a-52n represents one of the HAs 28a-28n, RAs 32a-32n, or DAs 38a-38n. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52n. Each of the directors 52a-52n may be coupled to the CM 54 so that any one of the directors 52a-52n may send a message and/or data to any other one of the directors 52a-52n without needing to go through the memory 26. The CM 54 may be implemented using conventional MUX/router technology where a sending one of the directors 52a-52n provides an appropriate address to cause a message and/or data to be received by an intended receiving one of the directors 52a-52n. Some or all of the functionality of the CM 54 may be implemented using one or more of the directors 52a-52n so that, for example, the directors 52a-52n may be interconnected directly with the interconnection functionality being provided on each of the directors 52a-52n. In addition, a sending one of the directors 52a-52n may be able to broadcast a message to all of the other directors 52a-52n at the same time.

In some embodiments, one or more of the directors 52a-52n may have multiple processor systems thereon and thus may be able to perform functions for multiple directors. In some embodiments, at least one of the directors 52a-52n having multiple processor systems thereon may simultaneously perform the functions of at least two different types of directors (e.g., an HA and a DA). Furthermore, in some embodiments, at least one of the directors 52a-52n having multiple processor systems thereon may simultaneously perform the functions of at least one type of director and perform other processing with the other processing system. In addition, all or at least part of the global memory 26 may be provided on one or more of the directors 52a-52n and shared with other ones of the directors 52a-52n.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and FIG. 2 or may be implemented using a platform that is somewhat or even completely different from any particular platform described herein.

Figure 3:
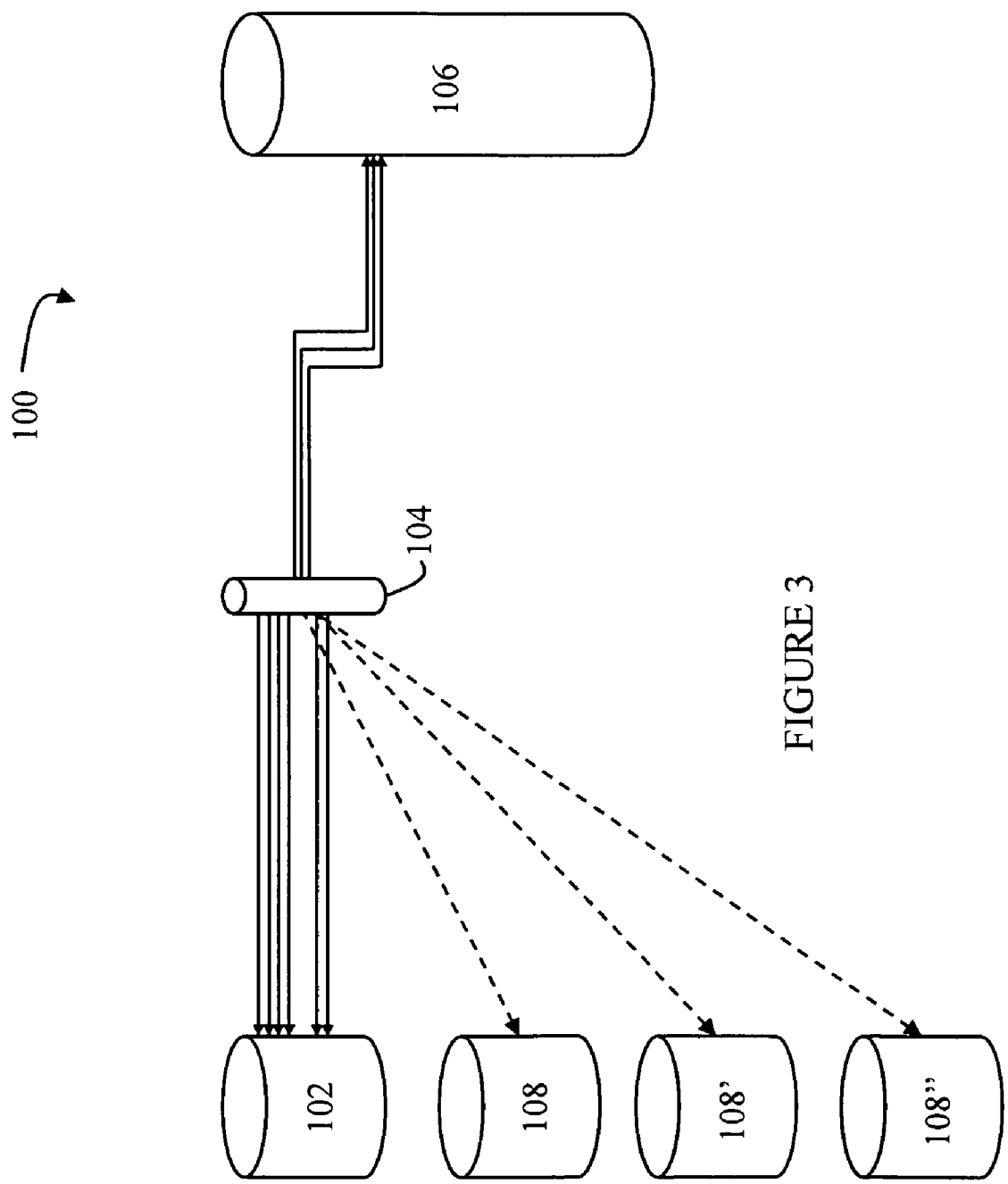
FIG. 3 is a schematic diagram illustrating a logical device, a snapshot copy, a pool device, and a full copy device according to an embodiment of the system described herein.

Referring to FIG. 3, a diagram 100 illustrates the system described herein. The system includes a logical device 102, a snapshot copy 104, a pool device 106, and a full copy device 108. The logical device 102 may be implemented using any appropriate storage logical device mechanism, such as logical storage devices used on the Symmetrix product provided by EMC Corporation of Hopkinton, Mass. Similarly, the snapshot copy 104 may be any logical snapshot device that can provide snapshot functionality for the logical device 102. The pool device 106 provides storage for sections of data (e.g., tracks) of the logical device 102 that are overwritten after the snapshot copy 104 has been initiated. The pool device 106 may be provided on the same physical device as the logical device 102 or may be provided on a different physical device. Use of the pool device 106 is discussed in more detail elsewhere herein.

The full copy device 108 may be a logical storage device like the logical device 102. As discussed in more detail elsewhere herein, the full copy device 108 may be configured to contain data copied from the logical device 102 and corresponding to the snapshot copy 104. As described below, the snapshot copy 104 may be created and then, subsequently, data from the logical device 102, and possibly the pool device 106, may be copied and/or refreshed to the full copy device 108 in a background process that does not interfere with access to the logical device 102. Once the copy is complete, then the point-in-time snapshot copy 104 is protected from physical corruption of the data of the logical device 102, as discussed in more detail elsewhere herein. Note that, as shown in FIG. 3, it is possible to have multiple copy devices 108', 108", etc. so that all of the copy devices 108, 108', 108" protect the snapshot copy 104 from physical corruption. Accordingly, for the discussion herein, it should be understood that references to the copy device 108 may include, where appropriate, reference to multiple copy devices. Note that, for some embodiments, the copy devices 108, 108', 108" may be copies provided at different times. Similarly, the system described herein may be applicable to multiple snapshot copies provided at the same time or different times.

Figure 4:
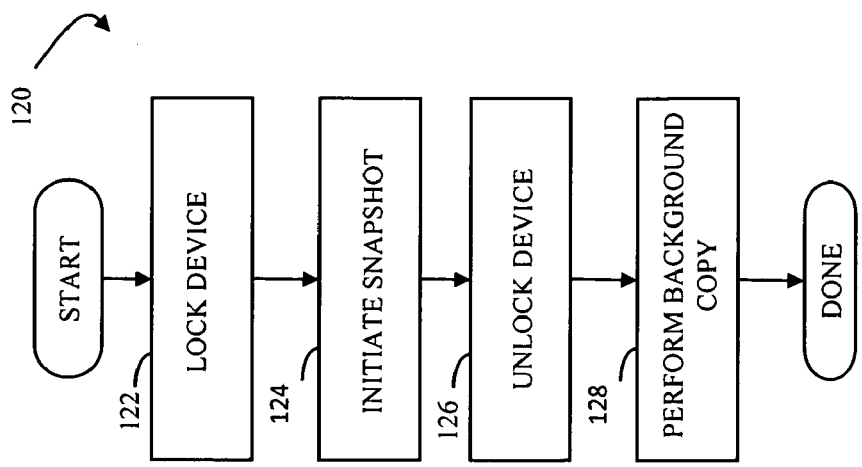
FIG. 4 is a flow chart illustrating providing a snapshot copy and multi-protection thereof according to an embodiment of the system described herein.

Referring to FIG. 4, a flow chart 120 illustrates steps performed in connection with providing a snapshot that can be made resistant to physical data corruption. Processing begins at a first step 122 where the logical device 102 is locked to prevent access thereto. In an embodiment herein, the logical device 102 is locked at the step 122 to prevent other processes/devices from writing new data while a snapshot is being created. Following the step 122 is a step 124 where the snapshot is initiated (created). Initiating/creating the snapshot at the step 124 is described in more detail elsewhere herein. Following the step 124 is a step 126 where the logical device 102 is unlocked. Following the step 126 is a step 128 where a background copy is performed to copy data corresponding to the snapshot copy 104 from the logical device 102 to the full copy device 108. Performing the background copy at the step 128 is described in more detail elsewhere herein. Note, however, that the background copy may be performed at the step 128 while the logical device 102 is accessed for reading and writing by other processes/devices.

Figure 5:
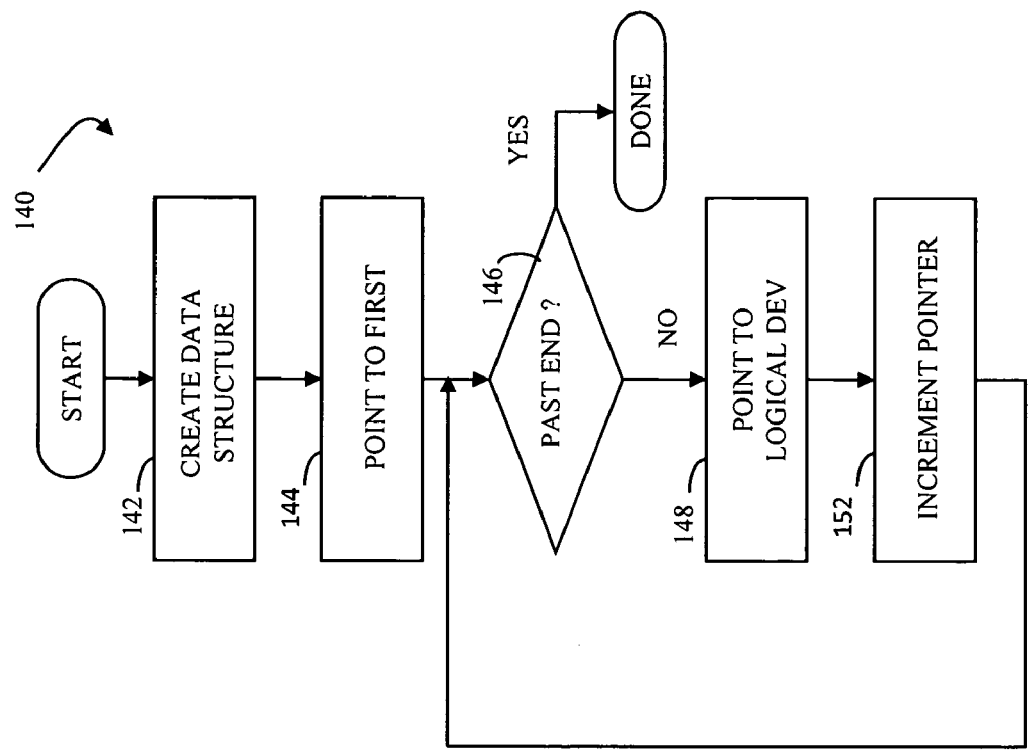
FIG. 5 is a flow chart illustrating creation of a snapshot copy according to an embodiment of the system described herein.

Referring to FIG. 5, a flow chart 140 illustrates steps performed in connection with creating/initiating the snapshot copy 104. Processing begins at a first step 142 where appropriate data structures (headers) are created for handling control information for the snapshot copy 104. Of course, the particular data structures that are created at the step 142 depend upon the particular file system, storage device, etc. In an embodiment herein, the data structures created at the step 142 include pointers to sections/tracks of data.

Following the step 142 is a step 144 where a pointer that is used to iterate through the sections/tracks of the logical device 102 is initialized to point to the first section/track. Following the step 144 is a test step 146 where it is determined if the counter is beyond the end of all of the logical device 102 (indicating that all of the sections/tracks have been processed). If so, then processing is complete. Otherwise, control transfers from the test step 146 to a step 148 where a pointer in the snapshot copy 104 corresponding to the iteration pointer is made to point to the corresponding section/track of the logical device 102. Following the step 148 is a step 152 where the pointer is incremented. Following the step 152, control transfers back to the step 146 for another iteration. Note that once all of the sections/tracks have been processed, then all of the pointers in the data structure of the snapshot copy 104 point to sections/tracks of the logical device 102.

Figure 6:
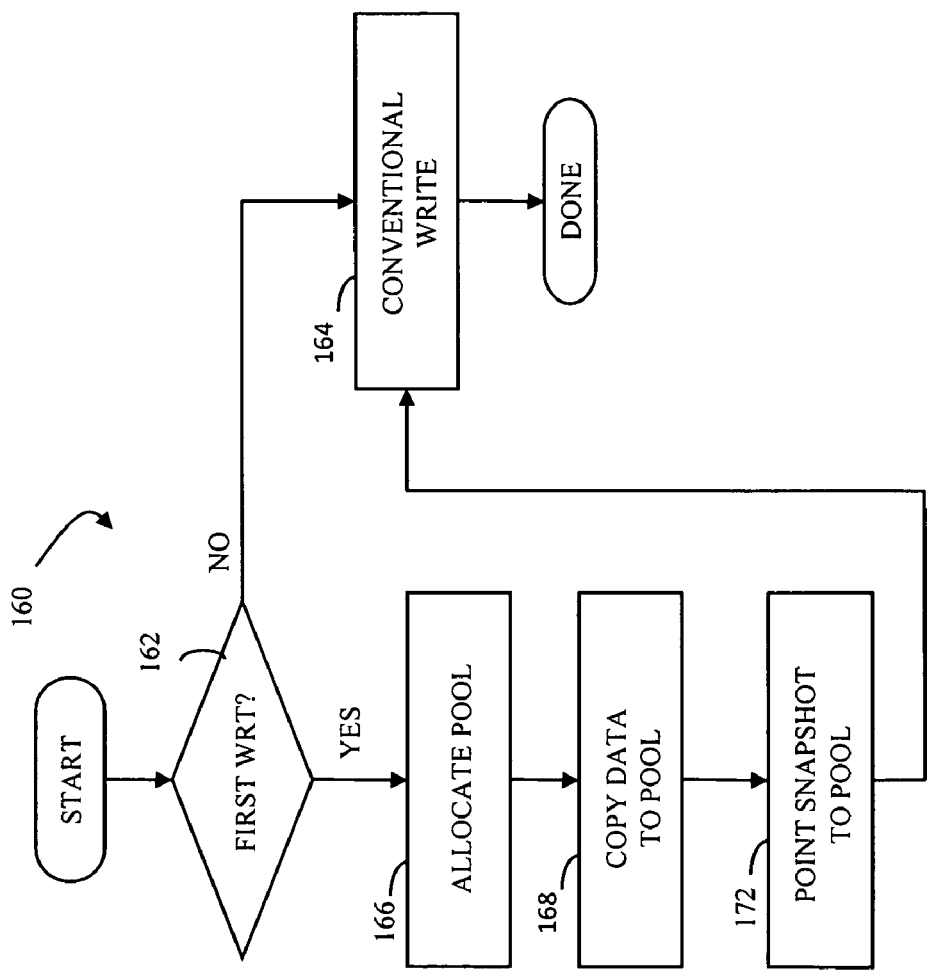
FIG. 6 is a flow chart illustrating handling data writes following creation of a snapshot copy according to an embodiment of the system described herein.

Referring to FIG. 6, a flow chart 160 illustrates steps performed in connection with handling data writes to a particular section/track of the logical device 102. In an embodiment herein, a first write to the particular section/track after initiating the snapshot copy 104 receives special processing in order to maintain the snapshot copy 104. Any appropriate mechanism for determining whether a write is a first write may be used, including setting one or more protection bits (for each section/track) to cause exception processing to be performed in response to I/O operations.

Processing begins at a first test step 162 where it is determined if the write is a first write to the particular section/track of the logical device 102 after creation/initiation of the snapshot copy 104 (i.e., if the particular section/track is otherwise unwritten after creation of the snapshot copy 104). If not, then control transfers from the test step 162 to a step 164 where the write proceeds in conventional fashion (i.e., the data is written to the logical device 102). Following the step 164, processing is complete.

If it is determined at the test step 162 that the write is the first write to the particular section/track of the logical device 102, then control transfers from the step 162 to a step 166 where data storage is allocated from the pool device 106. In an embodiment herein, the pool device 106 may be configured using one or more logical devices from which storage is allocated and data is accessed (written and read) in a conventional fashion as needed. Obviously other appropriate mechanisms may be used, including pre-allocating all storage upon initiation of the system, in which case the step 166 may be eliminated. Following the step 166 is a step 168 where the data at the particular section/track of the logical device 102 that is being written is copied to the recently allocated portion of the pool device 106. Following the step 168 is a step 172 where the appropriate entry(s) of the data structures of the snapshot copy 104 are made to point to the recently allocated portion of the pool device 106. Subsequently, accessing the snapshot copy 104 at the particular portion will cause the pool device 106 to be accessed. Following the step 172, control transfers back to the step 164, discussed above, to write the data to the logical device 102 in a conventional fashion.

As discussed elsewhere herein, creating the snapshot copy 104 protects against logical data corruption, but not necessarily physical data corruption. Accordingly, protection against physical corruption may be obtained by generating a full copy of the data from the logical device 102 corresponding to the snapshot copy 104 following creation of the snapshot copy 104, as discussed in detail below.

Figure 7:
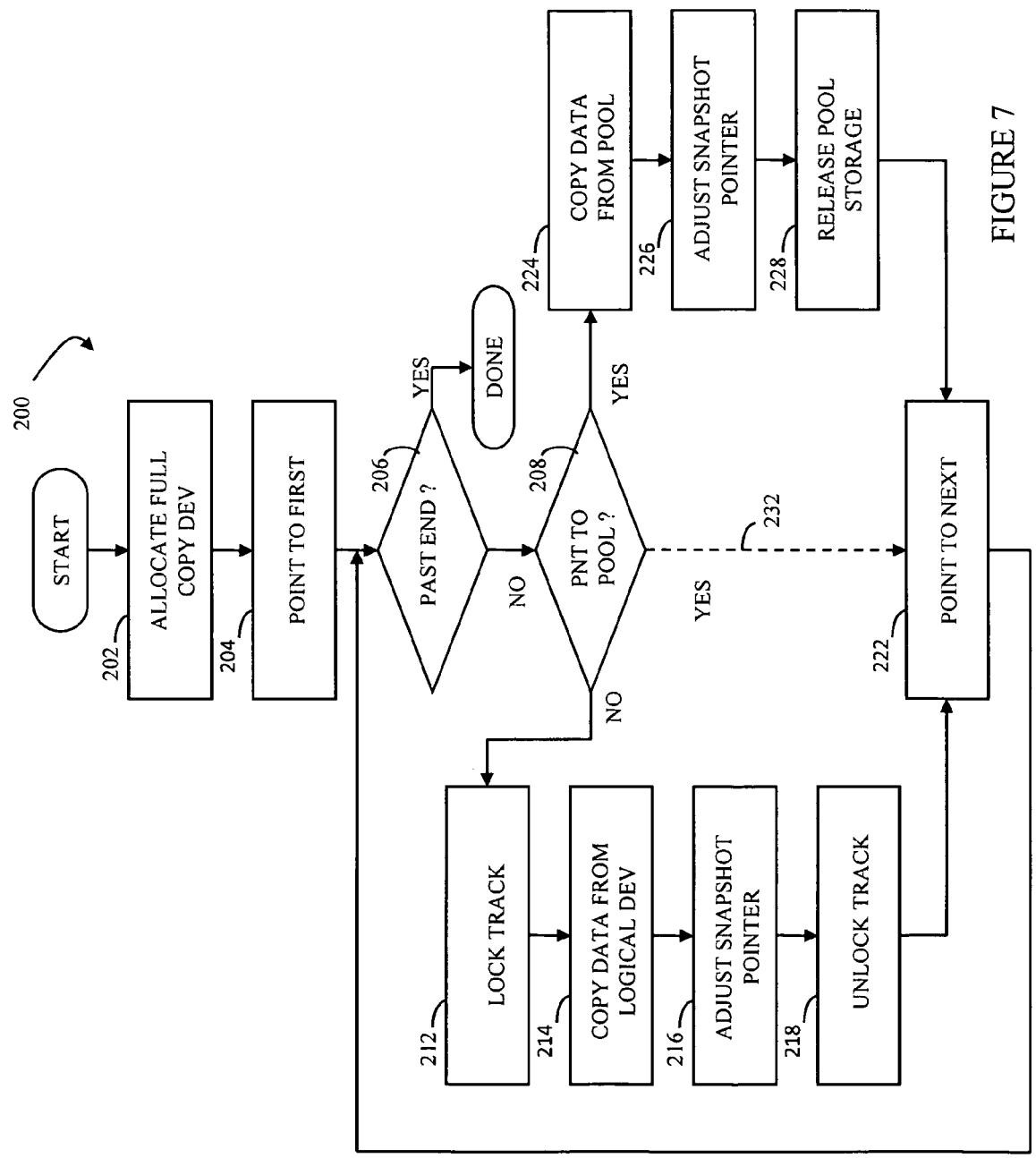
FIG. 7 is a flow chart illustrating creation of a full copy of a snapshot copy according to an embodiment of the system described herein.

Referring to FIG. 7, a flow chart 200 illustrates steps performed in connection with populating the full copy device 108 with data from the snapshot copy 104. As discussed elsewhere herein, after the snapshot copy 104 is created, the logical device 102 may be accessed by applications/hosts (not shown) in a conventional manner while the full copy device 108 is constructed in the background. Once the full copy device 108 is complete, the snapshot copy 104 is protected from physical corruption of the data.

Processing begins at a step 202 where the full copy device 108 is allocated (i.e., created). Obviously, if the full copy device 108 already exists and/or is already allocated, then the step 202 is not necessary. Following the step 202 is a step 204 where an iteration pointer that iterates through all of the sections/tracks of the logical device 102 is initialized to point to a first one thereof. Following the step 204 is a test step 206 where it is determined if the iteration pointer points past the end of the logical device 102 (i.e., all sections/tracks have been processed). If so, then processing is complete.

If it is determined at the test step 206 that the iteration pointer does not point past the end of the logical device 102, then control transfers from the test step 206 to a test step 208 where it is determined if the corresponding pointer of the snapshot copy 104 points to the pool device 106. The corresponding pointer of the snapshot copy 104 is the pointer of the snapshot copy 104 that points to the same section/track as the iteration pointer. If it is determined at the test step 208 that the corresponding pointer of the snapshot copy 104 does not point to the pool device 106 (and thus points to the logical device 102), then control transfers from the step 208 to a step 212 where the section/track of the logical device 102 is locked to prevent other processes/devices from accessing the section/track. Following the step 212 is a step 214 where the data from the section/track of the logical device 102 corresponding to the iteration pointer is copied to the full copy device 108.

Following the step 214 is a step 216 where the corresponding pointer for the snapshot copy 104 is adjusted to point to the section/track of the full copy device 108 that has just been generated. In some instances, the pointer may be implemented using two (or more) pointers where one (or more) point to the section/track of the full copy device(s) and the other points to the logical device. In effect, the pointer of the snapshot device 104 points to both the logical device 102 and the full copy 108 at the same time. Following the step 216 is a step 218 where the section/track of the logical device 102 is unlocked. Following the step 218 is a step 222 where the iteration pointer is incremented to point to the next section/track. Following the step 222, control transfers back to the step 206 for another iteration.

If it is determined at the test step 208 that the corresponding pointer of the snapshot copy 104 points to the pool device 106, then control transfers from the step 208 to a step 224 where the data from the section/track of the pool device 106 corresponding to the iteration pointer is copied to the full copy device 108. Following the step 224 is a step 226 where the corresponding pointer for the snapshot copy 104 is adjusted to point to the section/track of the full copy device 108 that has just been generated. Following the step 226 is a step 228 where the section/track of the pool device 106 corresponding data that was just copied is released (i.e., for reuse). Following the step 228, control transfers to the step 222, discussed above, to increment the iteration pointer and, subsequently, to perform the next iteration.

In an alternative embodiment, it is possible to not copy data from the pool device 106 to the full copy device 108, in which case it is not necessary to adjust any pointers of the snapshot copy 104. Essentially, any data that is provided on the pool device 106 is left in place rather than being copied to the full copy device 108. This is illustrated in an alternative path 232 from the step 208 to the step 222 shown in the flow chart 200. An advantage of this alternative embodiment is that the full copy may be provided sooner. A disadvantage includes possible inefficiencies in memory usage. For yet another embodiment of the system described herein, it is possible to first populate the full copy device 108 with just data from the logical device 102 and then, when that is complete, copy the remaining data from the pool device 106 to the full copy device 108. Advantages to this embodiment include providing protection for physical data corruption sooner while avoiding memory inefficiencies that may be associated with copying only data from the logical device 102. Note that, in embodiments where the pool data is stored on the logical device 102 (i.e., the pool device 106 and the logical device 102 use the same and/or related underlying physical device), then it is useful to protect the pool device data using the steps 224, 226, 228.

In some instances, it may not be desirable to create a new volume each time a snapshot is performed, especially since one reason for using a snapshot is to avoid the additional storage requirements of a full copy. Accordingly, it is possible to perform a full copy on the first snapshot and then just update the full copy for subsequent snapshots. This is explained in more detail below.

Figure 8:
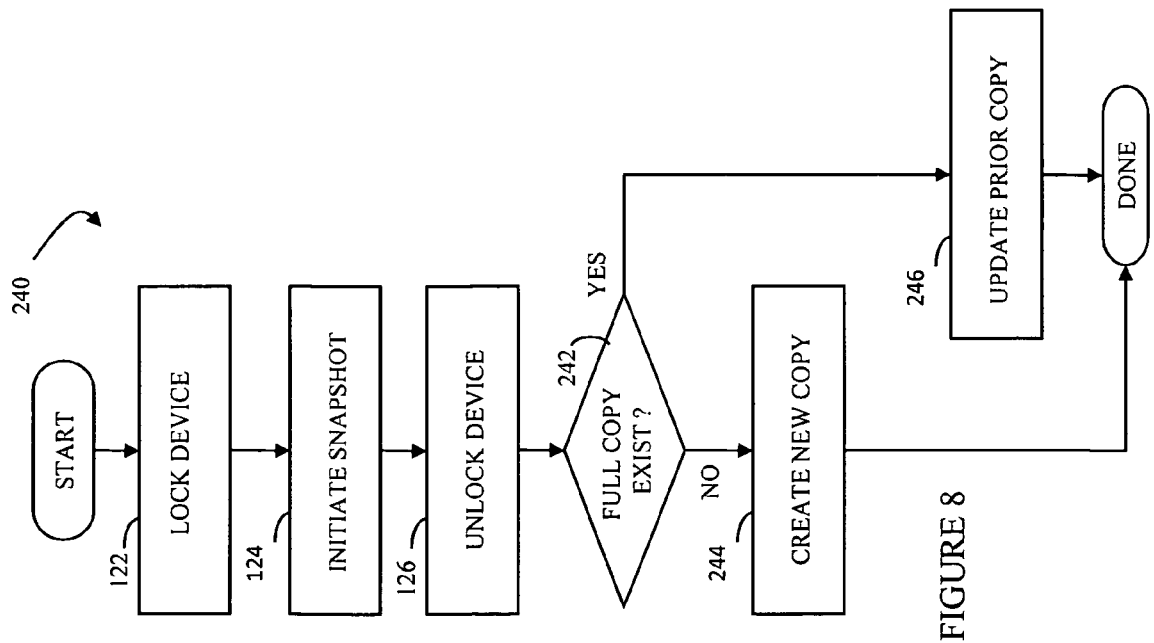
FIG. 8 is a flow chart illustrating providing a snapshot copy and multi-protection thereof according to an alternative embodiment of the system described herein.

Referring to FIG. 8, a flow chart 240 illustrates steps performed in connection with an alternative embodiment in which, for the first snapshot of a volume, a full copy is provided. The full copy is then subsequently updated for additional snapshots. The steps 122, 124, 126 of the flow chart 240 are the same steps as found in the flowchart 120 of FIG. 4. Following the step 126 is a test step 242 where it is determined if a full copy created by the snapshot mechanism already exists for the volume. If not, then control transfer from the step 242 to a step 244 where the new full copy corresponding to the data indicated by the snapshot is created. Processing at the step 244 is similar, if not identical, to processing performed at the step 128 of FIG. 4. In some instances, the snapshot pointer that points to the data at the logical volume 102 for which the snapshot has been performed also points to the corresponding full copy of the data Following the step 244, processing is complete.

If it is determined at the test step 242 that a full copy created by the snapshot mechanism already exists, then control transfers from the step 242 to a step 246, where the full copy corresponding to a previous snapshot version is updated to be consistent with the current version of the volume for which a snapshot is being provided. Processing at the step 246 is described in more detail elsewhere herein. Following the step 246, processing is complete. Note that, in an embodiment herein, the initial full copy may provided according to the processing illustrated by the path 232, described above, where data is maintained on the pool device 106 rather than being transferred to the full copy.

Figure 9:
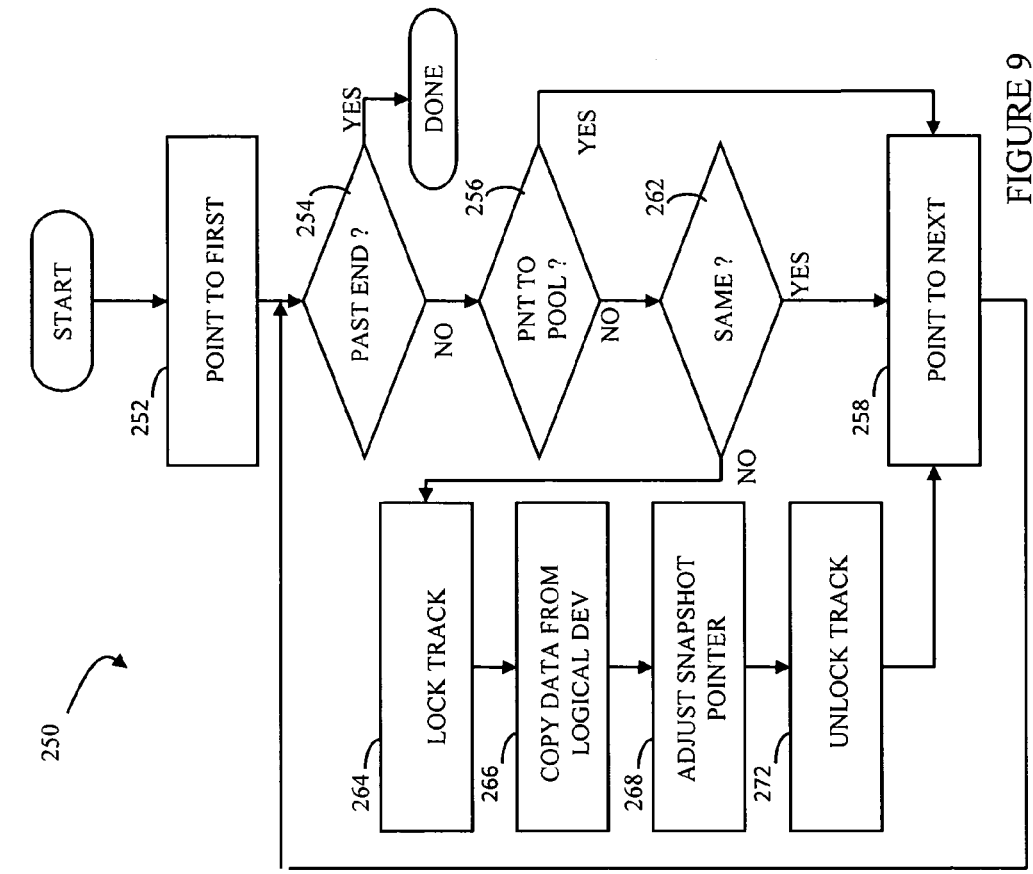
FIG. 9 is a flow chart illustrating updating a full copy according to an embodiment of the system described herein.

Referring to FIG. 9, a flow chart 250 illustrates in more detail processing performed in connection with the step 246 of the flow chart 240 of FIG. 8 where the full copy that is provided in connection with a first snapshot of a logical volume is updated to reflect the current state of the logical volume when subsequent snapshots are provided. Processing begins at a first step 252 where an iteration pointer, used to iterate through the tracks/sections, is initialized to point to the first one. Following the step 252 is a test step 254 where it is determined if the pointer points past the end of the device (i.e., all of the tracks/sections have been processed). If so, then processing is complete. Otherwise, control transfers from the test step 254 to a test step 256 where it is determined if the track/section of the snapshot device 104 corresponding to the iteration pointer points to the pool device 106. If so, then control transfers from the test step 256 to a step 258 where the iteration pointer is incremented. The full copy is used to protect against physical corruption of the storage corresponding to the logical device 102, and not necessarily corruption of the pool device 106. Following the step 258, control transfers back to the step 254 for another iteration.

If it is determined at the test step 256 that the track/section of the snapshot device 104 corresponding to the iteration pointer does not point to the pool device 106, then control transfers from the test step 256 to a test step 262 where it is determined if the track/section of the logical device 102 is the same as the track/section of the full copy 108. If so, then there is no updating that needs to be done for that track/section and control transfers to the step 258, discussed above, to increment the pointer at the start of another iteration. Otherwise, control transfers from the test step 256 to a step 264, which locks the track at the beginning of the copy process. The step 264 is followed by a step 266, which is followed by a step 272. The steps 264, 266, 268, 272 are similar, if not identical, to the steps 212, 214, 216, 218, discussed above in connection with the flow chart 200 of FIG. 7. Following the step 272, control transfers to the step 258, discussed above, to increment the pointer at the start of another iteration.

It some cases, it may be desirable to not make another full copy just to provide protection for a snapshot but, instead, use another full copy that has already been provided for another purpose. For example, a Business Continuation Volume (BCV) or an SRDF mirror, both provided by EMC Corporation of Hopkinton, Mass., may be used to provide a full copy of data to protect against disaster recovery. If a BCV, SRDF mirror, or some other type of data mirror exists, then the pointers of the snapshot volume may be made to point to the mirror/copy. Note also that the mirror may exist at the time of the snapshot or may come into existence after the snapshot is obtained. For this embodiment, the full copy 108 may be considered the full copy that already exists.

Figure 10:
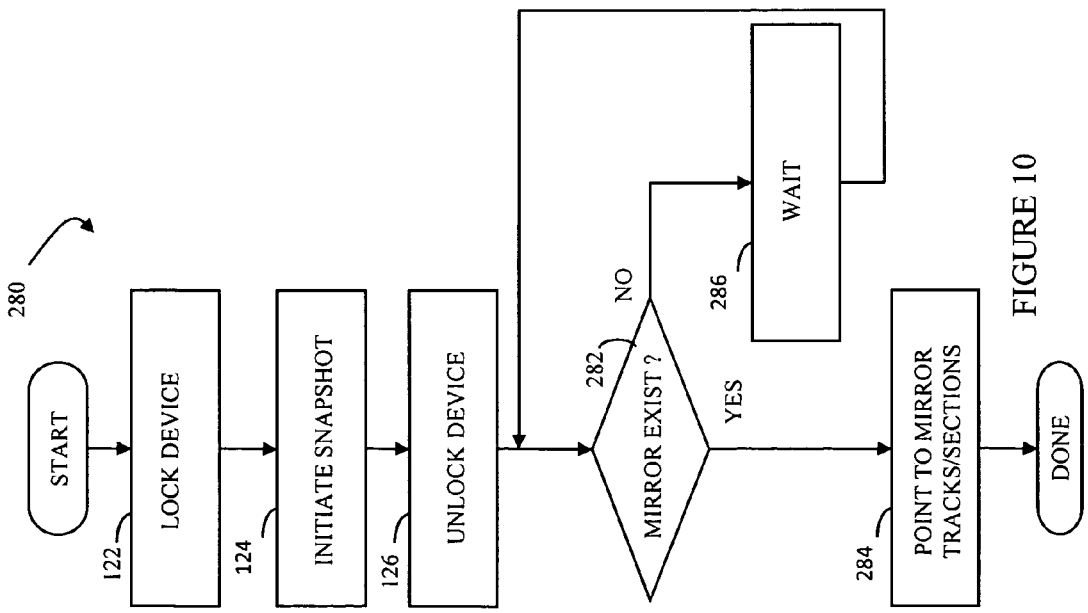
FIG. 10 is a flow chart illustrating providing a snapshot copy and multi-protection thereof according to an alternative embodiment of the system described herein.

Referring to FIG. 10, a flow chart 280 illustrates steps performed in connection with the alternative embodiment in which does not cause any extra full copies to be made in response to a snapshot but, instead, if possible uses a full copy that may exist for some other reason. The steps 122, 124, 126 of the flow chart 280 are the same steps as found in the flowchart 120 of FIG. 4. Following the step 126 is a test step 282 where it is determined if a full copy of the logical volume already exists. If so, then control transfer from the test step 282 to a step 284 where the pointers of the snapshot copy 104 that point to the logical volume 102 are made to point to the mirror copy. Processing at the step 284 is described in more detail elsewhere herein. Following the step 284, processing is complete.

If it is determined at the test step 282 that another full copy does not already exist, then control transfers from the step 282 to a step 286, where the system waits. The steps 282, 286 represent the system polling until a full copy is provided for some other purpose. Note that this may never happen. After waiting at the step 286, control transfers back to the step 282 for another iteration.

Figure 11:
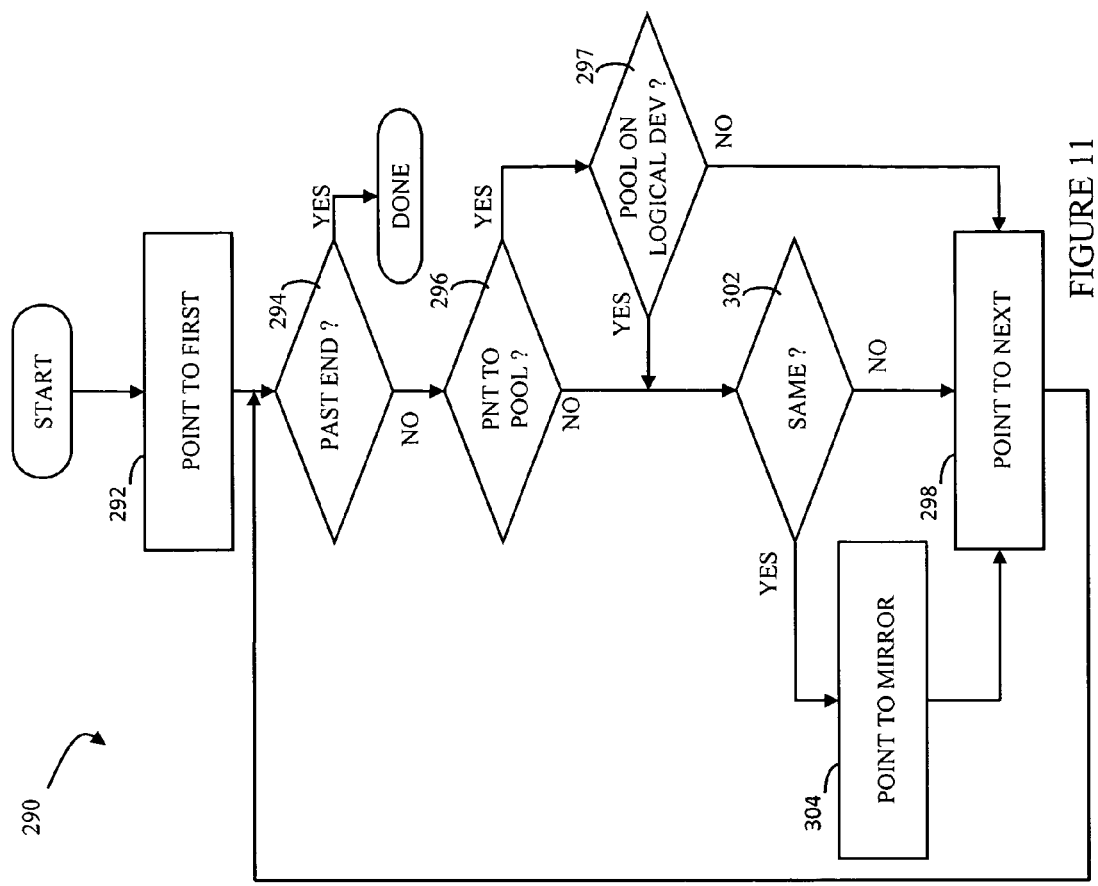
FIG. 11 is a flow chart illustrating pointing a snapshot copy to a full copy according to an embodiment of the system described herein.

Referring to FIG. 11, a flow chart 290 illustrates in more detail processing performed in connection with the step 284 of the flow chart 280 of FIG. 10. Processing begins at a first step 292 where an iteration pointer, used to iterate through the tracks/sections, is initialized to point to the first one. Following the step 292 is a test step 294 where it is determined if the pointer points past the end of the device (i.e., all of the tracks/sections have been processed). If so, then processing is complete. Otherwise, control transfers from the test step 294 to a test step 296 where it is determined if the track/section of the snapshot device 104 corresponding to the iteration pointer points to the pool device 106. If so, then control transfers from the test step 296 to a test step 297 where it is determined if the pool device 106 is being provided on the same physical device as the logical device 102. If not, then control transfers to a step 298 where the iteration pointer is incremented. Note that if the physical device used for the pool device 106 is different than the physical device used for the logical device 102, then the full copy may be used to protect against physical corruption of the storage corresponding to the logical device 102, and not necessarily corruption of the pool device 106. Following the step 298, control transfers back to the step 294 for another iteration.

If it is determined at the test step 296 that the track/section of the snapshot device 104 corresponding to the iteration pointer does not point to the pool device 106, then control transfers from the test step 296 to a test step 302 where it is determined if the track/section of the logical device 102 is the same as the track/section of the full copy 108. If not, then control transfers to the step 298, discussed above, to increment the pointer at the start of another iteration. Otherwise, control transfers from the test step 296 to a step 302 where the track/section of the snapshot device 104 is made to point to the track/section of the full copy (e.g., a BCV, SRDF mirror, etc.). Following the step 302, control transfers to the step 298, discussed above, to increment the pointer at the start of another iteration. Note that the step 302 is also reached from the step 297 if it is determined there that the pool device 106 is on the same physical device as the logical device 102.

Note that, in some cases, mirrors may be "split" from the logical device being mirrored. For example, it is possible to provide a BCV split mirror. In such a case, a write to the logical device may not be reflected in the mirror and vice versa. Accordingly, in instances where pointers of the snapshot device 104 point to both the logical device 102 and a mirror, it may be necessary to adjust the pointers of the snapshot device to point to only one when the other one has changed. Of course, if split mirrors are subsequently rejoined (resynchronized, refreshed), then pointers of the snapshot device may be restored to a state that occurred before the split.

Figure 12:
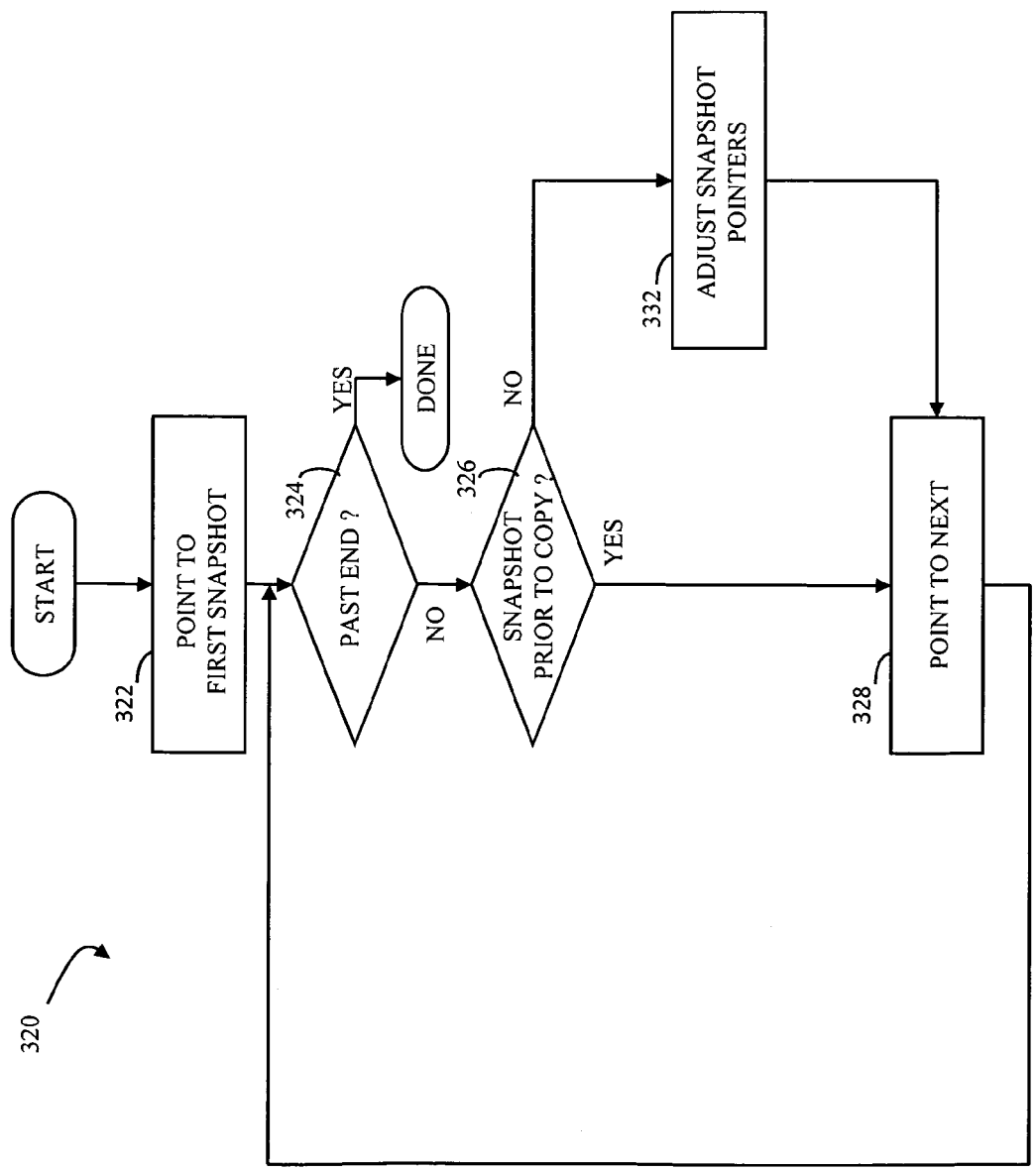
FIG. 12 is a flow chart illustrating steps performed in connection with a full copy being rejoined with the logical device according to an embodiment of the system described herein.

Referring to FIG. 12, a flow chart illustrates steps performed when a full copy is rejoined (resynchronized, refreshed) with the logical device. Processing begins at a first step 322 where a pointer, used to iterate through all of the snapshots, is made to point to the first snapshot. Following the step 322 is a test step 324 to determine if the pointer points past the end of all of the snapshot copies (i.e., all snapshots have been processed). If so, then processing is complete. Otherwise, control transfers from the test step 324 to a test step 326 where it is determined if the snapshot was created prior to the full copy. If not, then control transfers from the test step 326 to a step 328 where the iteration pointer is incremented. Following the step 328, control transfers back to the step 324 for another iteration.

If it is determined at the test step 326 that the snapshot was created prior to the full copy, then control transfers from the test step 326 to a step 332 to adjust the snapshot pointers, as discussed elsewhere herein. The processing at the step includes making the snapshot pointers point to both the logical device 102 and to the full copy thereof. In addition, as discussed elsewhere herein, in instances where the pool device 106 is on the same underlying hardware as the logical device 102, then it is possible to also protect the pool device.

Although the system described herein uses tracks as a unit of data for certain purposes, it should be understood that other units of data (including, possibly, variable length units of data) may be used. This also applies to other data structures and data units. In addition, in some instances, the order of steps in the flowcharts may be modified, where appropriate. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. The system operates with any snapshot mechanism not inconsistent therewith. The system also includes computer software, in a computer readable medium, that executes any of the steps described herein.

While the invention has been disclosed in connection with various embodiments, modifications thereon will be readily apparent to those skilled in the art. Accordingly, the spirit and scope of the invention is set forth in the following claims.

What is claimed is:

1. A method of providing a multiple protection snapshot copy of a logical device, comprising:
    creating the snapshot copy of the logical device, wherein, in response to a write to a section of the logical device, original data of the section of the logical device is copied to a first alternative storage area prior to the write;
    following creating the snapshot copy, copying the original data to a second alternative storage area;
    after copying the original data to the second alternative storage area, pointing portions of the snapshot copy to the second alternative storage area, wherein data corresponding to the snapshot copy is stored in at least one of: the first alternative storage area and the second alternative storage area;
    copying data from particular sections of the logical device to the second alternative storage area, wherein the data from the particular sections is data not copied to the first alternative storage area; and
    pointing other portions of the snapshot copy to the data from the particular sections on the second alternative storage.

2. A method, according to claim 1, further comprising:
    prior to copying data from the logical device, allowing access to the logical device.

3. A method, according to claim 1, wherein copying the original data to the second alternative storage area includes copying data from the first alternative storage area to the second alternative storage area.

4. A method, according to claim 3, further comprising:
    following copying data from the first alternative storage area to the second alternative storage area, releasing storage of the first alternative storage area.

5. A method, according to claim 1, wherein the first alternative storage area is a pool device that includes a plurality of logical storage devices.

6. A method, according to claim 1, wherein the second alternative storage area is another logical device.

7. A non-transitory computer-readable medium storing software that provides a multiple protection snapshot copy of a logical device, the software comprising:

executable code that creates the snapshot copy of the logical device, wherein, in response to a write to a section of the logical device, original data of the section of the logical device is copied to a first alternative storage area prior to the write;

executable code that, after creation of the snapshot copy, copies the original data to a second alternative storage area;

executable code that, after copying the original data to the second alternative storage area, points portions of the snapshot copy to the second alternative storage area, wherein data corresponding to the snapshot copy is stored in at least one of: the first alternative storage area and the second alternative storage area;

executable code that copies data from particular sections of the logical device to the second alternative storage area, wherein the data from the particular sections is data not copied to the first alternative storage area; and executable code that points other portions of the snapshot copy to the data from the particular sections on the second alternative storage area.

8. The non-transitory computer readable medium, according to claim 7, wherein the software further comprises:

executable code that allows access to the logical device prior to copying data from the logical device.

9. The non-transitory computer readable medium, according to claim 7, wherein the executable code that copies the original data to the second alternative storage area includes executable code that copies data from the first alternative storage area to the second alternative storage area.

10. The non-transitory computer readable medium, according to claim 9, wherein the software further comprises:

executable code that releases storage of the first alternative storage area following copying data from the first alternative storage area to the second alternative storage area.

11. The non-transitory computer readable medium, according to claim 7, wherein the first alternative storage area is a pool device that includes a plurality of logical storage devices.

12. The non-transitory computer readable medium, according to claim 7, wherein the second alternative storage area is another logical device.

13. A data storage device, comprising:

non-volatile memory; and a plurality of directors, coupled to the nonvolatile memory, wherein at least one of the directors provides external access to the storage device and wherein at least one other one of the directors provides a multiple protection snapshot copy of a logical device of the data storage device by creating the snapshot copy of the logical device that, in response to a write to a section of the logical device, copies original data of the section of the logical device to a first alternative storage area prior to the write, wherein the at least one other one of the directors, after creating the snapshot copy, copies the original data to a second alternative storage area, wherein the at least one other one of the directors, after copying the original data to the second alternative storage area, points portions of the snapshot copy to the second alternative storage area, and wherein the at least one other one of the directors further: copies data from particular sections of the logical device to the second alternative storage area, wherein the data from the particular sections is data not copied to the first alternative storage area, and points other portions of the snapshot copy to the data from the particular sections on the second alternative storage.

14. A data storage device, according to claim 13, wherein data corresponding to the snapshot copy is stored in at least one of: the first alternative storage area and the second alternative storage area.

15. A data storage device, according to claim 13, wherein the at least one other one of the directors copies the original data from the first alternative storage area to the second alternative storage area.

16. A data storage device, according to claim 13, wherein the directors access a global memory provided on the at least one of the directors.

17. A data storage device, according to claim 13, wherein the first alternative storage area is a pool device that includes a plurality of logical storage devices.

18. A data storage device, according to claim 13, wherein the second alternative storage area is another logical device.

* * * * *